United States Patent [19]

Wehner et al.

[11] Patent Number: 5,727,343

[45] Date of Patent: Mar. 17, 1998

[54] IRON CORD TENSION CONTROL METHOD AND APPARATUS

[76] Inventors: John C. Wehner, 2981 Frenchman's Passage, Palm Beach Gardens, Fla. 33410; Esther Sandoval, 250 180th St., Apt. 204, North Miami Beach, Fla. 33160

[21] Appl. No.: 665,756

[22] Filed: Jun. 18, 1996

Related U.S. Application Data

[60] Provisional application No. 60/000,919 Jul. 6, 1995.

[51] Int. Cl.⁶ .................... D06F 81/00; D06F 79/00; B65H 57/04; F16L 3/123
[52] U.S. Cl. .................... 38/141; 38/94; 248/51
[58] Field of Search .................. 38/104, 140, 106, 38/107, 137, 94, 141, 88; 24/115 R; 248/51, 58, 117.1; 219/245; 242/397, 157 R

[56] References Cited

U.S. PATENT DOCUMENTS

| | | |
|---|---|---|
| 994,605 | 6/1911 | Ricks . |
| 1,282,040 | 10/1918 | Bullock et al. . |
| 1,476,395 | 12/1923 | Davis ......................... 248/51 |
| 1,665,316 | 4/1928 | Matthews . |
| 2,190,108 | 2/1940 | Crammond ............... 248/51 |
| 2,191,011 | 2/1940 | Dorman . |
| 2,215,292 | 9/1940 | Koscierzyna ............. 248/51 |
| 2,606,979 | 8/1952 | Ringstad . |
| 2,680,789 | 6/1954 | Robinson . |
| 2,897,616 | 8/1959 | Edwards . |
| 3,082,983 | 3/1963 | Kaller . |
| 3,443,780 | 5/1969 | Bruening . |
| 3,481,570 | 12/1969 | Shettel ....................... 248/51 |
| 3,866,869 | 2/1975 | Woods ....................... 248/51 |
| 4,612,717 | 9/1986 | Alvarez . |
| 4,829,999 | 5/1989 | Auth ...................... 24/115 R X |

*Primary Examiner*—Ismael Izaguirre

[57] ABSTRACT

Electric iron power cord tensioning is accomplished by a pair of clips. A guide clip includes a looped member to receive and restrict cord transverse movement to the area defined by the looped member. The guide clip resiliently attaches to the periphery of the working surface of an ironing board and/or to the periphery of the ironing board defined by an ironing board cover with the looped member extending outwardly from the ironing board. A weight clip resiliently engages and is suspended from the cord subsequent to the guide clip to pull the cord and maintain it. Cord interference with the iron during ironing is reduced since the cord is prevented from bunching up and becoming entangled with or obstructing the iron. Alternatively, a cord support may be disposed about the power cord adjacent the iron handle to elevate and maintain the cord above the ironing board. The support may be used alone or in combination with the guide and weight clips. The support may be installed either by the end user as a slotted tube, or during manufacture via a rubber collar disposed continuously around the cord adjacent the iron handle. The support maintains the cord above the working space and thus reduces cord interference during ironing.

22 Claims, 2 Drawing Sheets

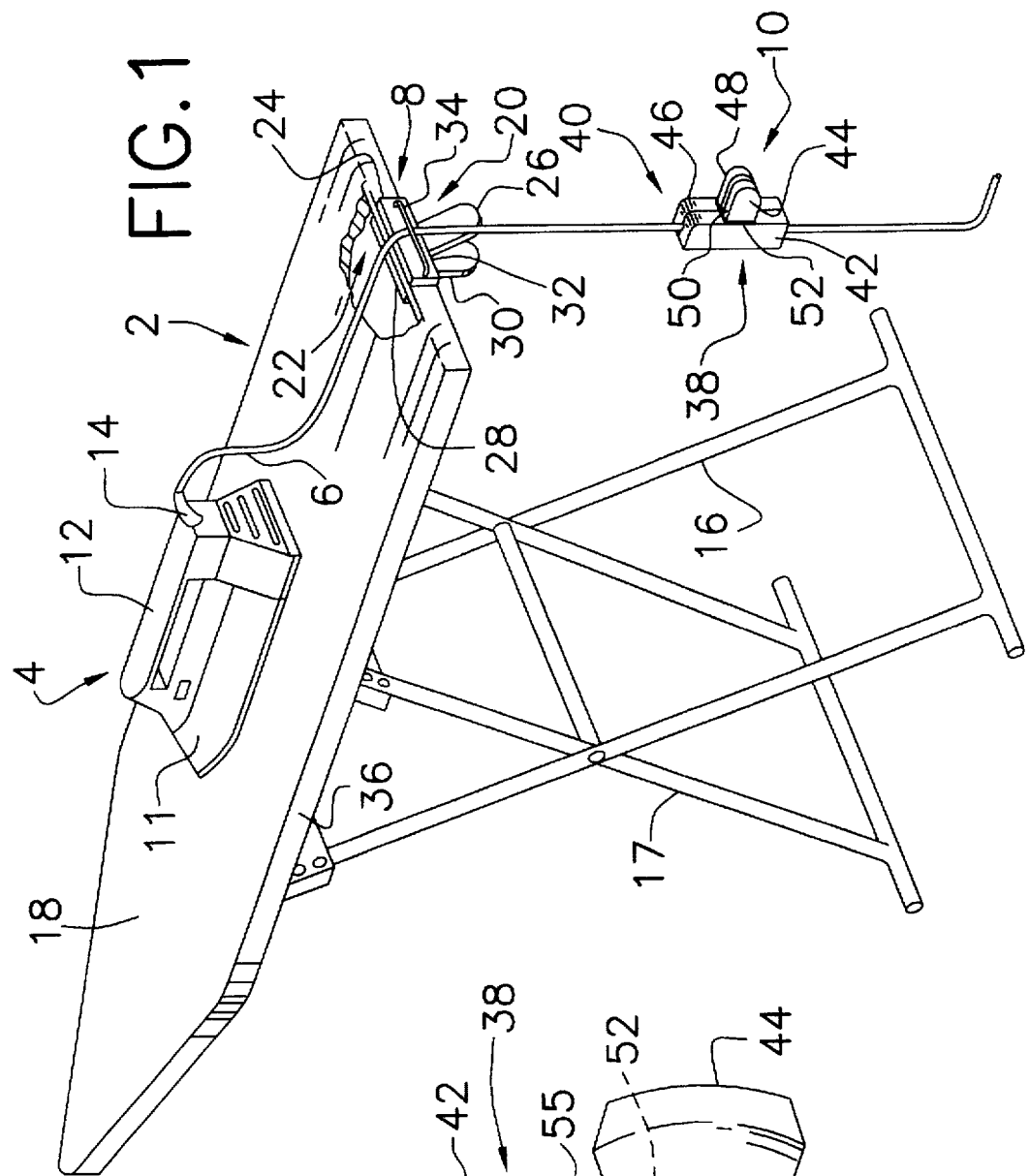
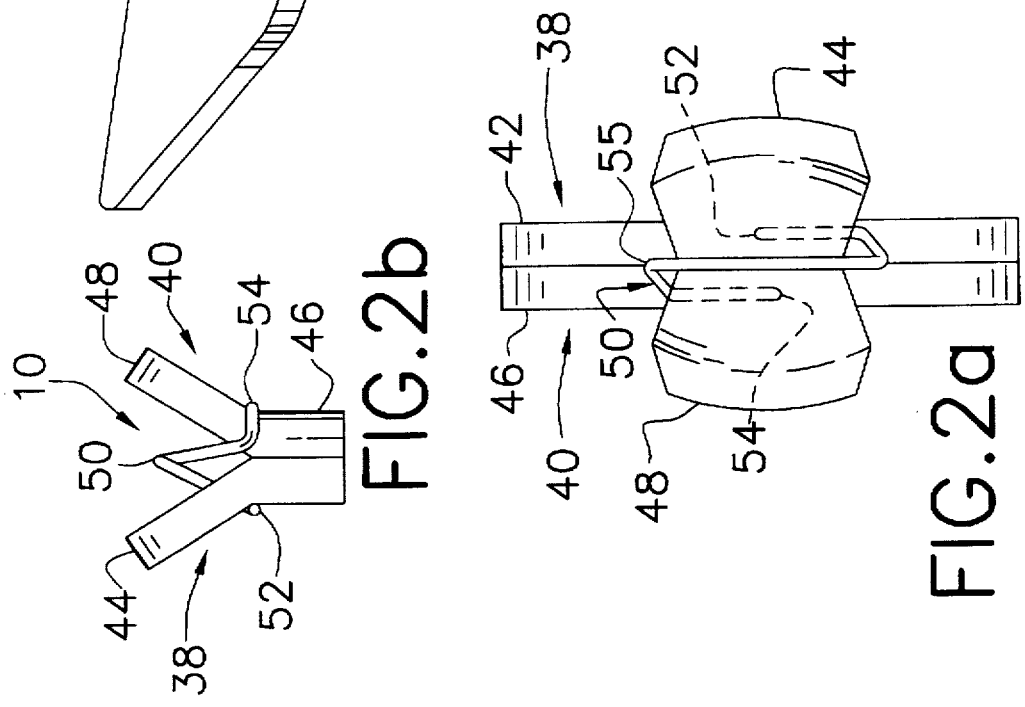

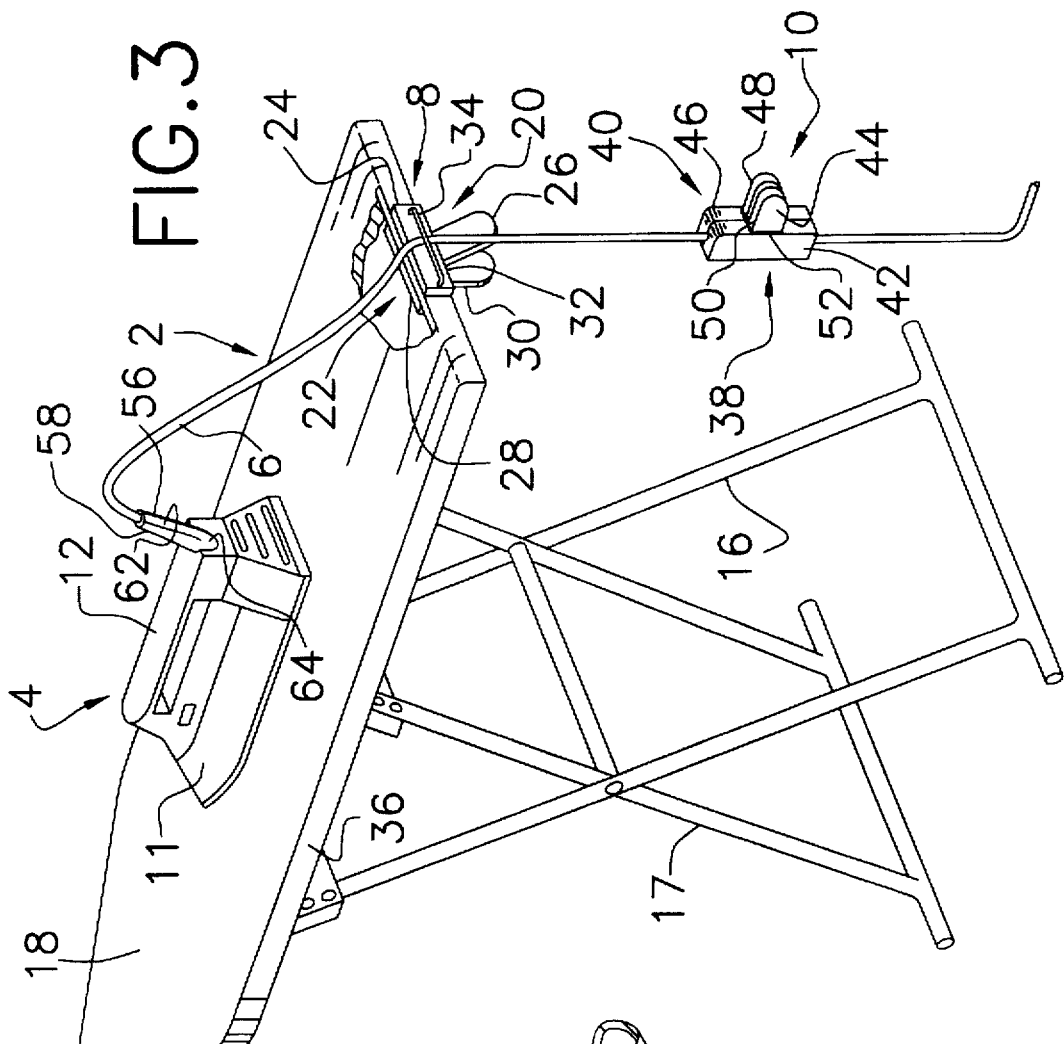
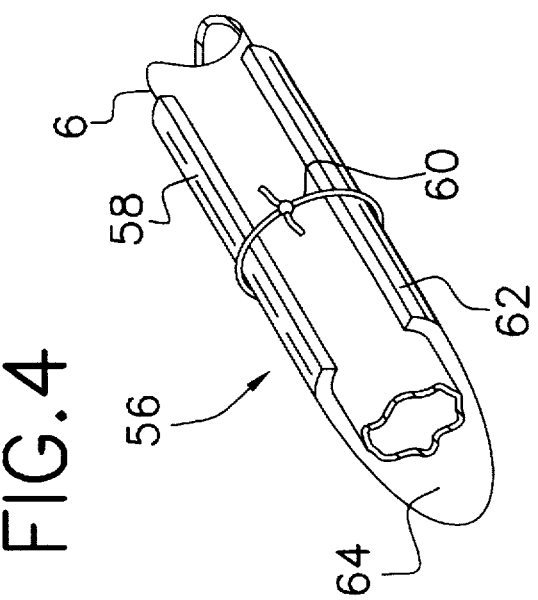

IRON CORD TENSION CONTROL METHOD AND APPARATUS

CROSS-REFERENCE TO RELATED APPLICATIONS

This application claims priority from U.S. Provisional patent application Ser. No. 60/000,919, filed Jul. 6, 1995.

BACKGROUND OF THE INVENTION

1. Technical Field

The present invention pertains to a method and apparatus for maintaining an electric iron power cord away from the working or application space of an ironing board or iron during ironing of clothes.

2. Discussion of Prior Art

Generally, electric irons have become a common household appliance frequently utilized to enhance the appearance of various types of clothing by removing wrinkles and/or creases. Irons are typically utilized atop an ironing board and have electric cords of substantial length to connect the irons to conventional wall outlet jacks. However, the electric power cord length often presents various impediments to an operator when ironing clothes. For example, the cord often engages the ironing board edge, becomes entangled, or intercepts the path of the iron during ironing operation. These impediments result in lower efficiency and prolonged ironing times because the power cord and the clothes must be repositioned such that the cord does not interfere with the ironing process. Further, roaming power cords may present a fire hazard should the hot iron contact the cord and erode the electrical insulation surrounding electrical wires disposed in the cord. In short, lengthy electrical power cords tend to interfere with the free and unrestricted use of irons.

There are numerous prior art attempts to obviate the aforementioned shortcomings of the electric cord by utilizing devices to restrict cord movement during ironing. For example, Matthews (U.S. Pat. No. 1,665,316) discloses a device that attaches to an ironing board and has a loop through which the electric iron cord passes. A weight is suspended from the cord at a location between the loop and an electrical outlet jack to maintain the cord taut. Bullock et al (U.S. Pat. No. 1,282,040) disclose a support adapted to be connected to the handle of an iron to support an electric cord and maintain it away from the ironing board to reduce interference with items being ironed. Alvarez (U.S. Pat. No. 4,612,717) discloses a retaining guide in the form of a ring for receiving an electric cord while a weight maintains the cord taut. The attachment of the cord to the iron keeps the cord in an orientation directed upwardly and away from the iron. Edwards (U.S. Pat. No. 2,897,616) discloses an adjustable attachment for an ironing board extending beyond the edge of the ironing board in a C-shape to restrict cord movement. A weight is suspended from the cord to maintain it taut. The attachment is adjustable to accommodate various ironing board widths, and includes hinges to enable the C-shaped cord guide to fold over the ironing board for storage.

The prior art suffers from several disadvantages. The cord guides are typically attached via clamps having a screwing mechanism which must be turned to secure the guide to the ironing board, thereby requiring substantial time for set-up and/or repositioning the guide during different parts of the ironing process. Further, the weights are not secured but instead slide along the cord and tend to bump into various objects (e.g., the ironing board, wall, operator's leg, etc.) during operation of the iron. Moreover, the cord guides are typically made of metal, thereby incurring substantial costs and weight. In addition, cord supports attached to the iron are difficult to install, obtrusive, and may not be pre-installed during iron manufacture.

OBJECTS AND SUMMARY OF THE INVENTION

Accordingly, it is an object of the present invention to improve ironing efficiency by restricting electric iron cord movement during ironing such that the iron power cord does not become entangled with itself or clothes, slide along the edge of the ironing board, or interfere with the iron.

It is another object of the present invention to improve ironing efficiency by restricting electric iron cord movement during ironing via a simple, inexpensive, lightweight and easily transportable and/or attachable cord guide and weight capable of being mounted at numerous positions on an ironing board (i.e., on the ironing board itself or on an ironing board cover disposed on the ironing board) and iron power cord, respectively, to accommodate various items being ironed.

Yet another object of the present invention is to restrict electric iron cord movement during ironing by means of a weight secured to the cord such that the weight maintains its position on the cord and maintains the cord taut in a straight line along the ironing board surface between the iron and an edge of the ironing board.

Still another object of the present invention is to minimize electric iron power cord interference during ironing via an inexpensive, easily attachable and/or pre-installed cord support maintaining the cord away from the ironing workspace.

The aforesaid objects are achieved individually and in combination, and it is not intended that the present invention be construed as requiring two or more of the objects to be combined unless expressly required by the claims attached hereto.

According to the present invention, an iron power cord tension control method and apparatus is accomplished by a pair of spring clips. A guide clip is utilized as a cord guide to restrict movement of an electric iron cord during ironing. This clip is attached to an edge and/or cover of an ironing board and includes a guide element in the form of an arc or loop located on an exterior surface of the clip through which the power cord passes to connect to a wall outlet jack. The guide limits transverse cord movement such that the cord is maintained at a fixed location extending over the ironing board edge (i.e., the cord does not move or "creep" over a corner or otherwise along an edge of the ironing board) and does not interfere with the iron workspace during ironing.

The second or weight clip is utilized as a weight and is attached directly to, and suspended from, the power cord at a location between the guide clip and the wall outlet jack. The weight clip acts as a tensioning device in that it maintains the cord taut between the iron and an end of the guide clip by removing cord slack during ironing.

The clips may be plastic spring clips having two members resiliently biased closed by a metal spring disposed between the two members. Each member includes a substantially rectangular jaw and a rounded handle extending from the approximate center of the jaw. Compressing the handles toward one another opens the jaws which resiliently close upon release of the handles. The jaws may include teeth or serrated edges to enhance gripping of the ironing board, cover or cord. Alternatively, the spring clip may be a single piece of resilient material bent to form two jaws biased closed with similar handles for opening the jaws.

A cord support may be attached to the iron to elevate and maintain the iron cord away from the ironing workspace. The support typically includes a slotted plastic or rubber tube which surrounds the proximal end of the cord adjacent the iron handle. A projection extending downwardly (i.e., distally) from the distal end of the tube along a rear side of the iron (i.e., the side adjacent the proximal end of the handle) maintains the tube in an erect state to elevate the cord. The support may be secured to the cord via a cable tie after purchase of the iron, or alternatively, may be pre-installed as a thick collar during manufacture of the iron. Cord interference may be reduced by utilizing the cord support either alone or in conjunction with the cord guide and weight clips described above.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

BRIEF DESCRIPTION OF THE DRAWINGS

FIG. 1 is a view in perspective of the cord tension control apparatus of the present invention attached to an ironing board and iron.

FIG. 2a is a top view in plan of a clip employed by the cord tension control apparatus of the present invention.

FIG. 2b is a side view in elevation of a clip employed by the cord tension control apparatus of the present invention.

FIG. 3 is a view in perspective of the cord tension control apparatus of FIG. 1 employing a cord support on the iron according to the present invention.

FIG. 4 is a view in perspective of a cord support according to the present invention.

DESCRIPTION OF THE PREFERRED EMBODIMENTS

A tension control apparatus for preventing electric iron power cords from interfering with an operator ironing clothes is illustrated in FIG. 1. Specifically, a conventional iron 4 is disposed on a substantially horizontal top or working surface 18 of an ironing board 2. Ironing board 2 may include a conventional ironing board cover (not shown) and is illustrated as an isolated unit having a vertical ledge 36 disposed about its perimeter and extending downwardly from the peripheral edge of horizontal surface 18. Diagonally oriented collapsible legs 16, 17 extend generally downward from the underside of the board and collapse to facilitate ironing board storage. Ironing board 2 has a conventional configuration with a substantially rectangular proximal section merging into a distal section wherein the board width tapers distally. The distal section occupies approximately the distalmost one-third of the ironing board and has a rounded distal end. The illustrated ironing board is conventionally configured; however, the present invention is applicable to all ironing boards or other substantially horizontal surfaces where ironing may be performed (e.g., tables, ironing boards attached to walls, etc.). Iron 4 typically includes a flat base surface 11 for applying heat and/or steam to clothes, a handle 12 disposed adjacent the base and extending longitudinally along the iron, and an electric cord 6 extending from the proximal end of the handle. Electric cord 6 includes a plug (not shown) at its distal end for insertion into a conventional wall outlet jack, and a flexible collar 14 at its proximal end to insulate and protect electrical wires disposed in the cord.

Various types of clothing are generally placed flat on working surface 18 of ironing board 2, and iron 4 is gripped via handle 12 with base surface 11 pressed against the clothing. The iron is then moved about over the clothing to remove wrinkles and or creases. As iron 4 traverses the clothing, attached power cord 6 follows the iron and may, if not otherwise restrained, become slack and bunch up on surface 18, thereby tending to become entangled with itself or the clothing and interfering with the ironing process. In order to restrict such movement of power cord 6, a guide clip 8 and a weight clip 10 are disposed on ironing board 2 and power cord 6, respectively. Specifically, guide clip 8 includes two pivotably engaged gripping members 20, 22 having respective distal jaws 24, 28 and proximal handles 26, 30. Members 20, 22 are resiliently biased to pivot to a closed position (i.e., jaws 24, 28 forced together) by a metal spring 32 disposed between handles 26, 30. Jaws 24, 28 are substantially rectangular with a relatively long dimension parallel to the pivot axis, and a significantly shorter dimension perpendicular to that axis. The jaws may include teeth or a serrated distal edge to enhance gripping. Handles 26, 30 respectively extend from the approximate center of jaws 24, 28 in a direction either generally perpendicular to the pivot axis, or at lesser and opposing angles (i.e., angles less than ninety degrees) such that the handles are separated by a proximally increasing distance. The handle width (i.e., the dimension parallel to the pivot axis) is considerably shorter than the handle length. Jaws 24, 28 include rounded proximal corners adjacent handles 26, 30. The long dimension of the jaws is preferably about one-quarter the width of the proximal end of ironing board 2. Handles 26, 30 have a shorter dimension substantially similar to the shorter dimension of jaws 24, 28, while the longer dimension of the handles are approximately one and one-half times the shorter dimension of the jaws. By way of example only, jaw 24 includes a cord guide 34 disposed on the exterior surface of the jaw, however, either jaw may include the cord guide. Cord guide 34 preferably takes the form of a bar or rod with right angle bends proximate its ends to form a flattened U-shape. The ends of the bar are secured to the exterior surface of jaw 24 to define a rectangular guide space between the bar and the jaw surface. The rod may be of any transverse cross-sectional shape (e.g., polygon, circle, ellipse) and extend parallel to the jaw surface for any desired length, preferably as long as possible to permit the power cord maximum freedom of transverse movement in the guide 34. The spacing between the bar and the exterior surface of jaw 24 must at a minimum be slightly greater than the dimensions of a conventional plug disposed at the distal end of cord 6 such that the plug and cord may be inserted longitudinally through cord guide 34. Alternatively, cord guide 34 may include a small opening in the bar to permit cord 6 to be inserted transversely through the opening into the confines of the guide. In this case, the opening may include a resilient or other latch to maintain the cord within the confines of the guide, and the distance between the bar and the exterior surface of jaw 24 may be any distance capable of receiving the cord. Power cord 6 is disposed through cord guide 34 such that the cord guide restricts transverse cord movement to the distance defined by the cord guide length.

Guide clip 8 may be disposed on ironing board 2 by applying a force to pinch handles 26, 30 together in opposition to the bias of spring 32, thereby opening jaws 24, 28 (i.e., moving jaws 24, 28 apart) until the distance between the jaws is greater than the thickness of vertical ledge 36. Guide clip 8 may then be positioned at any location along ledge 36 with jaws 24, 28 encompassing, and handles 26, 30 extending downwardly from, the ledge. The force opposing the spring bias is subsequently removed to enable the jaws to close and engage the ledge. The guide clip may be moved to any location along ledge 36 during an ironing procedure to facilitate positioning of the iron on the garment being pressed. Alternatively, guide clip 8 may be manipulated as described above to enable jaws 24, 28 to engage a conventional ironing board cover (e.g., in the case where the guide clip cannot engage the ledge) disposed on ironing board 2. Guide clip 8 may be positioned at any location on the cover suitable for facilitating positioning of the iron on the garment being pressed.

Weight clip 10 is substantially similar to guide clip 8 except that the weight clip does not include a cord guide. Clip 10 includes two pivotably engaged gripping members 38, 40 each having a jaw 42, 46 and handle 44, 48, respectively. Members 38, 40 are resiliently biased to pivot to a closed position by a metal spring 50 disposed between the members. Jaws 42, 46 are generally similar to jaws 24, 28; handles 44, 48 are generally similar to handles 26, 30; and members 38, 40 are generally similar to members 20, 22. In the preferred embodiment the longer dimension of jaws 44, 48 of weight clip 10 is greater than the corresponding longer dimension of jaws 24, 28 of guide clip 8. This longer length provides greater weight to maintain cord 6 taut.

Weight clip 10 may be disposed on cord 6 by applying force to pinch handles 44, 48 together in opposition to the bias of spring 50, thereby opening jaws 42, 46 until the distance between the jaws is greater than the diameter of cord 6. Clip 10 may then be positioned at any longitudinal point along cord 6 between guide clip 8 and a wall outlet jack such that clip 10 is suspended from the cord above the floor. The weight of clip 10 pulls on the power cord to keep it taut along the working surface. Care should be taken when placing clip 10 on the power cord to make sure that it does not contact guide clip 8 or the floor during ironing. Since the dimensions of clip 10 (i.e., the longitudinal length of the jaws and transverse length of the clip) are greater than the area enclosed by cord guide 34 of clip 8, cord guide 34 can block clip 10 should clip 10 be drawn into contact with clip 8. Blocked clip 10, being attached to cord 6, prevents power cord 6 from sliding through cord guide 34 and therefore inhibits movement of the iron. On the other hand, contact by clip 10 with the floor renders the weight clip ineffective to keep the power cord taut, thereby permitting the cord to bunch up and become entangled. When open, jaws 42, 46 encompass cord 6 at the desired cord position. The force opposing the bias of spring 50 is removed to enable the jaws to close and engage the cord. Clip 10, in effect, acts as an anchor and utilizes its weight to remove slack and maintain cord 6 taut in a substantially straight line from the iron to cord guide 34. Since clip 10 engages power cord 6, movement of the cord with the iron 4 causes the clip to move up and down with the suspended cord to keep the cord taut.

Clips 8, 10 may be conventional clips substantially similar to clips utilized to reclose potato chip or other snack bags, and employ a spring to resiliently bias the clips closed as illustrated in FIGS. 2a–2b. By way of example only, the spring is described with reference to weight clip 10, however, guide clip 8 functions in substantially the same manner. Metal spring 50 is disposed between members 38, 40 coincident handles 44, 48, such that the longitudinal axis of the spring (i.e., the pivot axis) is parallel to the longer dimension of jaws 42, 46, and the shorter dimension of the handles. The pivot axis of clip 10 may be located at any point along the longer dimension of handles 44, 48 capable of enabling the clip to be securely disposed on the cord. For example, the pivot axis may reside at the proximal end of handles 44, 48 when the handles extend from jaws 42, 46 at opposing angles and are separated by a proximally increasing distance. Alternatively, handles 44, 48 may include projections (not shown) extending transversely from the interior surfaces of the handles at various locations along the longer dimension of the handles. The projections engage each other between handles 44, 48 to separate the handles and form the pivot axis. Spring 50 is typically a metal wire having five consecutive substantially perpendicular sections. An intermediate section 55 is disposed between members 38, 40 while the ends of the wire extend from the intermediate section around respective handles 44, 48 to engage an outwardly facing exterior surface of each handle. Specifically, the wire extends from intermediate section 55 along the shorter dimension of jaws 42, 46, in opposing directions, and bends approximately ninety degrees subsequent to reaching the exterior surface of a respective handle 44, 48 to form respective arms 52, 54. Arms 52, 54 extend substantially the entire shorter dimension of respective handles 44, 48 and apply force (i.e., a bias force) from spring 50 to the base of the handles to maintain jaws 42, 46 closed. The spring may be implemented by any spring arrangement or resilient device capable of providing bias to maintain the members closed. Alternatively, the jaws may be made from one piece of spring metal, much like bulldog clips used to clip papers together.

An alternative embodiment, for supporting power cord 6 to extend it upward and away from the ironing workspace is illustrated in FIGS. 3 and 4. The iron cord tension apparatus is substantially similar to the apparatus described above for FIGS. 1, 2a, 2b except that iron 4 includes cord support 56 for extending cord 6 above working surface 18. Specifically, cord support 56 is disposed over the proximal end of cord 6 at the iron handle 12 where cord 6 extends from the iron. Support 56 is typically a rigid or semi-rigid plastic or rubber tube having a substantially cylindrical section 62 with a longitudinal slot 58 extending along the entire length of the section. However, the support may be implemented by a tube having any cross-sectional shape (e.g., circle, polygon, ellipse) capable of fitting around the proximal end of cord 6. A projection 64 extends downwardly (i.e., distally) from the distal end of section 62 angularly offset approximately one-hundred eighty degrees from slot 58. The width of projection 64 typically tapers distally to form a rounded distal end, however, the projection may be of any shape capable of elevating cord 6 as described below. Support 56 has a diameter slightly greater than the diameter of cord 6, and has a length of approximately six inches, although the length is not critical so long as the support serves its described function. Cord 6 may be transversely inserted through slot 58 such that support 56 surrounds the cord to rigidify and elevate the cord above horizontal surface 18 and minimize interference by the cord during ironing. Support 56 may be secured about cord 6 via a cable tie 60 or the like. The distal end of section 62 rests on the top surface of handle 12 while projection 64 extends downwardly from the handle against the rear side of the iron (i.e., the side adjacent and extending downwardly from the proximal end of the handle). Projection 64 opposes the gravitational forces applied by cord 6 and enables support 56 to remain upright and elevate the cord. Alternatively, support 56 may be pre-installed as a thick rubber collar during manufacture of the iron and function as described above. Cord interference may be reduced by utilizing support 56 either as a stand-alone unit, or in conjunction with guide clip 8 and weight clip 10 in substantially the same manner described above.

Operation of the present invention is described with reference to FIGS. 1, 3 and 4. Initially, an ironing board 2 is removed from storage and assembled with iron 4 placed on working surface 18. Guide clip 8 is attached to vertical ledge 36 (for example, at the proximal end or at a side) of the ironing board such that cord guide 34 extends horizontally outward or away, and handles 26, 30 extend downwardly, from the ledge. Clip guide 8 is attached to ironing board 2 by applying pinching force to handles 26, 30 to oppose the bias of spring 32 and separate jaws 24, 28. Jaws 24, 28 are then positioned on opposite sides of ledge 36 such that, when the force opposing the spring bias is removed, the jaws close on and engage ledge 36. Alternatively, guide clip 8 may be attached to a conventional ironing board cover disposed on ironing board 2 in substantially the same manner described above. Cord 6 extends through cord guide 34 and is connected to a wall outlet jack. Weight clip 10 is then attached to cord 6 at a location between cord guide 34 and the wall outlet jack. The preferred location for weight clip 10 is a point where the clip will not engage guide clip 8 or the floor during ironing so that the weight clip maintains the cord taut. Weight clip 10 is attached in substantially the same manner described above for guide clip 8 by applying pinching force to handles 44, 48 to oppose the spring bias and open jaws 42, 46, positioning the cord between the jaws at a desired location, and then removing the force to enable the jaws to engage the cord. After the guide and weight clips 8, 10 are positioned, ironing may commence with cord 6 maintained taut and its movement restricted to minimize interference with iron 4 and the clothes.

The preferred location for cord guide 34 during ironing is at the proximal end of the ironing board. It will be appreciated that the guide can be easily moved to different locations along ledge 36 or on the ironing board cover to facilitate ironing various garments or different pads of a garment or item. Further, cord guide 34 may engage the ironing board, ironing board cover, or combination of the ironing board and cover to restrict iron cord movement.

When cord support 56 is attached to cord 6 at the proximal end of iron handle 12, the support elevates and maintains cord 6 above the ironing workspace on surface 18 to further reduce cord interference during ironing.

Cord support 56 may be utilized in conjunction with or without guide and weight clips 8, 10. When they are used together, cord support 56 elevates and maintains cord 6 above the ironing workspace while guide clip 8 and weight clip 10 respectively restrict cord movement and maintain the cord taut to minimize cord interference with the iron.

It will be appreciated that the embodiments described above and illustrated in the drawings represent only a few of the many ways of implementing an iron cord tension control system. The important aspects of clips 8 and 10 are that they are quickly and easily attached to the ironing board and/or ironing board cover and power cord in a variety of orientations and at a variety of locations. The quick and easy installation of the clips permit them to be moved easily to accommodate various garments during an ironing operation without a significant expenditure of time as required by screw attachments and the like.

The clips of the present invention may be any clips or grasping devices including a guide to restrict cord movement. The clips may be constructed of wood, plastic, metal or other sturdy material, and include a spring or other bias or resiliency device to bias the clips closed. The weight clip may be implemented by any device capable of being suspended from, or disposed on, the cord and being of sufficient weight to maintain the cord taut. The guide clip may be positioned at any orientation and at any point along the perimeter of the ironing board and/or ironing board cover capable of reducing cord interference during ironing. The present invention may be utilized on any ironing board or horizontal surface having an area for the guide clip to engage. The cord guide may be implemented by rods, of any shape forming loops or guides of any size capable of confining cord movement to a specified area. The jaws of the guide and weight clips may be dull, have teeth, or have serrated edges to enhance the gripping capabilities. The cord support may be constructed of rubber, plastic, or other sturdy material capable of elevating the cord above the working space. The cord support may be implemented by any rigid or semirigid tube and may be secured by cable tie or other securing mechanism capable of securing the support to the cord.

Although the preferred embodiment of the invention utilizes a vertical ledge 36 as the attachment structure for clip 8, it is to be understood that the clips can be sized to attach to an ironing board peripheral edge having no such ledge, or be attached to a conventional ironing board cover disposed on the ironing board. In this regard, the invention involves quick and simple attachment and/or relocation of guide 34 by means of a spring loaded clip and is not limited to any particular ironing board or cover or any particular orientation (i.e., vertical) of the ironing board structure and/or cover to which clip 8 attaches.

It is to be understood that the principles of the present invention may be accomplished by any clip devices capable of guiding an electric cord and weighing the cord down to remove slack, or devices capable of elevating and maintaining the cord above the workspace. Further, the principles of the present invention may be applied to appliances, power tools, or other electric devices to prevent cord interference and potentially hazardous situations from accidental cord contact.

From the foregoing description it will be appreciated that the invention makes available a novel iron cord tension control method and apparatus wherein a guide clip having a cord guide is disposed on an ironing board and a weight clip is disposed on the electric iron cord subsequent to traversing the cord guide to restrict cord movement during ironing and reduce cord interference.

Having described preferred embodiments of a new and improved iron cord tension control method and apparatus, it is believed that other modifications, variations and changes will be suggested to those skilled in the art in view of the teachings set forth herein. It is therefore to be understood that all such variations, modifications and changes are believed to fall within the scope of the present invention.

What is claimed is:

1. An apparatus for restricting electric iron power cord movement and controlling tension of the cord to reduce cord interference with the iron during ironing, wherein said apparatus is for use with an ironing board having a working surface and a peripheral edge, and an electric iron having a handle with a proximal end from which the power cord extends from the iron, said apparatus comprising:

a guide clip having first and second gripping members pivotably engaged with each other for resiliently engaging said peripheral edge, and a cord guide secured to an exterior surface of said first gripping member for receiving and limiting transverse movement of said power cord to a limited part of said exterior surface; and a weight disposed on and suspended from said cord to apply a force pulling said cord proximally from said iron to maintain the cord taut as the iron moves along said working surface.

2. The apparatus of claim 1 wherein said weight comprises a clip having a pair of gripping members for resiliently engaging said cord.

3. The apparatus of claim 1 wherein said cord guide includes a looped member disposed on said exterior surface of said first gripping member to limit transverse movement of said cord to the area defined by the looped member and the exterior surface of the first gripping member.

4. The apparatus of claim I further including:

a cord support disposed about the cord adjacent the iron handle for elevating and maintaining the cord above the horizontal surface of the ironing board.

5. An apparatus for restricting electric iron power cord movement and controlling tension of the cord to reduce cord interference with the iron during ironing, wherein said apparatus is for use with an ironing board having a working surface and a peripheral edge, and an electric iron having a handle and a rear side wherein said handle includes a proximal end from which the power cord extends from the iron and said rear side is disposed adjacent and extends downwardly from said proximal end of said handle, said apparatus comprising:

a guide clip having a pair of gripping members for resiliently engaging said peripheral edge, and a cord guide secured to said clip for receiving and limiting transverse movement of said power cord to a limited part of said edge;

a weight disposed on and suspended from said cord to apply a force pulling said cord proximally from said iron to maintain the cord taut as the iron moves along said working surface; and a cord support disposed about the cord adjacent the iron handle for elevating and maintaining the cord above the horizontal surface of the ironing board wherein said cord support includes:

a tube having a slot extending longitudinally along the entire tube through which the cord may be transversely inserted into the tube;

a projection extending downwardly from a distal end of said tube along the rear side of the iron to maintain the tube in an erect state to elevate the cord; and securing means for preventing the cord from egressing from said tube through said slot.

6. The apparatus of claim 5 wherein said securing means comprises a cable tie.

7. The apparatus of claim 4 wherein said cord support is a thick circumferentially continuous collar disposed about said cord adjacent said iron handle.

8. The apparatus of claim 1 wherein said guide clip includes a spring disposed between said gripping members to resiliently bias said members closed to engage said peripheral edge of said ironing board.

9. The apparatus of claim 1 wherein said gripping members of said guide clip are adapted to resiliently engage a vertical ledge defining said peripheral edge of said ironing board.

10. The apparatus of claim 1 wherein said gripping members of said guide clip are adapted to resiliently engage an ironing board cover disposed on said ironing board and defining said peripheral edge.

11. Apparatus for reducing electric iron power cord interference with an electric iron during ironing, wherein said apparatus is for use with an ironing board having a top horizontal surface, and an iron including a handle having a proximal end where the cord extends from the iron and a rear side adjacent and extending downwardly from the proximal end of the handle, comprising:

a tube disposed adjacent the iron handle having a slot extending longitudinally therethrough and through which the cord may be transversely inserted into the tube;

a projection extending downwardly from a distal end of said tube along the rear side of the iron to maintain the tube in an erect state; and securing means for securing the tube to the cord;

wherein said tube elevates and maintains the cord above the horizontal surface of the ironing board.

12. The apparatus of claim 11 wherein said securing means comprises a cable tie.

13. A method for restricting electric iron power cord movement and controlling tension of the cord to reduce cord interference between the cord and iron during ironing on an ironing board having a working surface having a peripheral edge with an iron including a handle having a proximal end from which the cord extends, comprising the steps of:

(a) resiliently securing first and second gripping members of a guide clip to said peripheral edge wherein said first and second gripping members are pivotably engaged to each other;

(b) receiving said cord in a cord guide disposed on an exterior surface of said first gripping member to limit transverse cord movement to a limited part of said exterior surface; and (c) disposing a weight on said cord distally of said guide clip such that said weight is suspended from said cord to maintain said cord taut during ironing.

14. The method of claim 13 wherein step (c) includes:

(c.1) resiliently securing said weight on said cord.

15. The method of claim 13 further including the step of:

(d) disposing a cord support around the cord adjacent the iron handle to elevate and maintain the cord above the working surface of the ironing board.

16. The method of claim 13 wherein step (a) includes:

(a.1) disposing said guide clip having a spring disposed between said first and second gripping members on said peripheral edge; and (a.2) resiliently biasing the gripping members closed and engaging a said peripheral edge with said gripping members to limit cord movement.

17. The method according to claim 13 wherein step (a) includes securing said guide clip to a vertical ledge depending from the periphery of said ironing board.

18. The method of claim 13 wherein said ironing board includes an ironing board cover disposed on said ironing board and defining said peripheral edge, and wherein step (a) includes securing said guide clip to said cover.

19. A method for reducing electric iron power cord interference with an iron during ironing, wherein said ironing utilizes an ironing board having a top horizontal surface, and an iron including a handle having a proximal end where the cord extends from the iron and a rear side adjacent and extending downwardly from the proximal end of the handle comprising the steps of:

(a) inserting the cord transversely through a longitudinal slot in a tube such that the tube surrounds the cord adjacent the iron handle;

(b) securing the tube about the cord;

(c) maintaining the tube in an erect state via a projection extending downwardly from a distal end of the tube along the rear side of the iron; and (d) elevating the cord via the tube above the working surface of an ironing board.

20. A method for restricting electric iron power cord movement and controlling tension of the cord to reduce cord interference with the iron during ironing, said method comprising the steps of:

(a) forming a guide clip for disposal on the periphery of an ironing board wherein said guide clip is formed to have first and second gripping members pivotably engaged with each other for engaging said ironing board periphery and a looped member disposed on an exterior surface of the first gripping member to limit transverse cord movement to a limited part of said exterior surface; and (b) forming a weight clip for disposal on said cord wherein said weight clip is formed to have a weight sufficient to maintain said cord in a taut state.

21. A method for restricting electric iron power cord movement and controlling tension of the cord to reduce cord interference with the iron during ironing, said method comprising the steps of:

(a) forming a guide clip for disposal on the periphery of an ironing board wherein said guide clip is formed to have a pair of resiliently engaged gripping members for engaging said ironing board periphery and a looped member disposed on an exterior surface of the guide clip to limit transverse cord movement to an area defined by said exterior surface and said looped member;

(b) forming a weight clip for disposal on said cord wherein said weight clip is formed to have a weight sufficient to maintain said cord in a taut state; and (c) forming a cord support having a slot extending longitudinally along the support to enable transverse insertion of the cord within the cord support, a projection extending from a distal end of the support to maintain the support in an erect state, and securing means for securing the support about the cord, wherein said support is disposed around said cord adjacent a handle of the iron to elevate and maintain said cord above a horizontal surface of said ironing board.

22. The method of claim 20 wherein step (a) further includes:

(a.1) forming said guide clip to limit transverse cord movement to an area defined by said exterior surface and said looped member when said guide clip engages the periphery of an ironing board defined by a cover disposed on said ironing board, and said cord is disposed in said looped member.

* * * * *